United States Patent [19]

Stuebe

[11] 4,098,708

[45] Jul. 4, 1978

[54] SUBSTITUTED HYDROXYAROMATIC ACID ESTERS AND LUBRICANTS CONTAINING THE SAME

[75] Inventor: Carl Walter Stuebe, Beachwood, Ohio

[73] Assignee: The Lubrizol Corporation, Wickliffe, Ohio

[21] Appl. No.: 587,513

[22] Filed: Jun. 16, 1975

[51] Int. Cl.² .............................................. C10M 1/32
[52] U.S. Cl. ............................. 252/51.5 A; 252/56 R; 560/67
[58] Field of Search .................... 252/51.5 A, 51.5 R, 252/56 R; 260/474

[56] References Cited

U.S. PATENT DOCUMENTS

| 3,736,357 | 5/1973 | Piasek et al. | 252/51.5 A |
| 3,936,480 | 2/1976 | Demoures | 252/51.5 A |

FOREIGN PATENT DOCUMENTS 1,117,388  6/1968  United Kingdom ............ 252/51.5 R

*Primary Examiner*—Daniel E. Wyman
*Assistant Examiner*—Y. Harris-Smith
*Attorney, Agent, or Firm*—James W. Adams, Jr.; S. I. Khayat

[57] ABSTRACT

Esters of alkyl-substituted hydroxyaromatic carboxylic acids (especially alkyl-substituted salicylic acids) and the like, in which the alkyl substituent contains at least about 10 carbon atoms, are useful as dispersant additives for lubricants and fuels. Particularly useful are esters in which the substituent is derived from propylene, 1-butene or isobutene and has a molecular weight of about 150–1750, and in which the alkyl moiety is derived from pentaerythritol. Such esters are preferably prepared by the reaction of the corresponding organic hydroxy compound with a vic-hydroxyalkyl ester of the salicylic acid.

23 Claims, No Drawings

SUBSTITUTED HYDROXYAROMATIC ACID ESTERS AND LUBRICANTS CONTAINING THE SAME

This invention relates to new compositions of matter useful as dispersant additives for lubricants and normally liquid fuels, and to lubricants and concentrates containing the same. More particularly, it relates to compositions comprising esters of substituted hydroxyaromatic carboxylic acids in which at least one substituent is a hydrocarbon-based radical containing at least about 10 carbon atoms.

As used herein, the term "hydrocarbon-based radical" denotes a radical having a carbon atom directly attached to the remainder of the molecule and having predominantly hydrocarbon character within the context of this invention. Such radicals include the following:

(1) Hydrocarbon radicals; that is, aliphatic, (e.g., alkyl or alkenyl), alicyclic (e.g., cycloalkyl or cycloalkenyl), aromatic, aliphatic- and alicyclic- substituted aromatic, aromatic-substituted aliphatic and alicyclic radicals, and the like, as well as cyclic radicals wherein the ring is completed through another portion of the molecule (that is, any two substituents may together form an alicyclic radical). Such radicals are known to those skilled in the art. Examples of those having at least about 10 carbon atoms, and thus contemplated as within the scope of this invention, include decyl, isodecyl, dodecyl, pentadecyl, eicosyl, triacontyl and the like, as well as radicals derived from substantially saturated petroleum fractions, olefin polymers and highly refined white oils or synthetic alkanes.

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo, nitro, cyano, RO-,

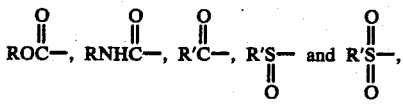

wherein R may be hydrogen or a hydrocarbon radical and R' may be a hydrocarbon radical.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen, and sulfur.

In general, no more than about three substituents or hetero atoms, and preferably no more than one, will be present for each 10 carbon atoms in the hydrocarbon-based radical.

As previously noted, the esters of this invention are derived from substituted hydroxyaromatic carboxylic acids in which one substituent is a hydrocarbon-based radical as defined hereinabove. The radical is preferably an aliphatic-hydrocarbon radical free from acetylenic unsaturation. It is usually substantially saturated; i.e., at least about 95% of the carbon-to-carbon bonds are saturated. The radical usually contains about 10–7000 carbon atoms, preferably about 10–225 carbon atoms. In some instances, however, a higher molecular weight radical, e.g., one having a molecular weight of about 50,000–100,000 (number average, as determined by vapor phase osmometry), is desirable since such a radical can impart viscosity index improving properties to the composition.

Especially desirable for the purposes of this invention are esters of acids containing aliphatic substituents derived from polymers of propylene, 1-butene or isobutene, said substituents having a molecular weight of about 150–3000 and usually of at least about 500.

Hydroxyaromatic precursors for the carboxylic acids convertible to esters of this invention include phenol, naphthols, phenols and naphthols containing lower molecular weight alkyl substituents as well as other substituents of the type recited hereinabove with reference to the hydrocarbon-based radical, etc. Phenol is the preferred hydroxyaromatic precursor. The hydroxyaromatic compound containing the hydrocarbon-based radical is conveniently prepared by reacting a hydrocarbon-based compound, preferably a polymer as aforementioned, with the hydroxyaromatic precursor at a temperature of about 50°–2000° C. in the presence of a suitable catalyst such as aluminum chloride, boron trifluoride or zinc chloride.

The substituted hydroxyaromatic carboxylic acid may contain more than one hydrocarbon-based substituent as defined hereinabove. It may also contain lower molecular weight alkyl substituents as well as other substituents of the type recited hereinabove with reference to the hydrocarbon-based radical. Acids containing more than one hydroxy or carboxy radical are contemplated as within the scope of the invention. Usually, however, the substituted hydroxyaromatic carboxylic acid will contain only one hydrocarbon-based substituent, one hydroxy radical and one carboxy radical. Especially preferred are the hydrocarbon-substituted salicylic acids. Reference hereinafter will be made primarily to the salicylic acids, but it is to be understood that other substituted hydroxyaromatic carboxylic acids may be used in place thereof.

Substituted salicylic acids may be prepared from the corresponding substituted phenols, which are well known in the art, by the "Kolbe-Schmitt reaction" which comprises reacting a salt, preferably an alkali metal salt, of the phenol with carbon dioxide and subsequently acidifying the salt thus obtained. The conditions of the carbonation reaction are likewise well known to those skilled in the art. It may be carried out at atmospheric or superatmospheric pressure in a substantially inert, non-polar liquid diluent as defined hereinafter.

The esters of this invention may be prepared from the free salicyclic acids or derivatives thereof by known methods. Thus, they may be prepared by reaction of at least one organic hydroxy compound with at least one free acid or with at least one acid halide, ester, anhydride or the like. Suitable organic hydroxy compounds include mono- or polyhydri hydrocarbon-based alcohols such as methanol, ethanol, the propanols, butanols, pentanols, hexanols, heptanols, octanols, decanols, dodecanols, hexadeconals, etc., as well as the so-called fatty alcohols and their mixtures which are discussed in detail under the title "Higher Fatty Alcohols" in Kirk-Othmer, "Encyclopedia of Chemial Technology", Second Edition, John Wiley and Sons, N.Y., 1965, Vol. 1, pp. 542–557. Among such alcohols are lauryl, myristyl, cetyl, stearyl and behenyl alcohols.

Fatty alcohols containing minor amounts of unsaturation (e.g., no more than about two carbon-to-carbon unsaturated bonds per molecule) are also useful and are exemplified by palmitoleyl ($C_{16}H_{32}O$), oleyl ($C_{18}H_{36}O$) and eicosenyl ($C_{20}H_{40}O$) alcohols.

Higher synthetic monohydric alcohols of the type formed by the Oxo process (e.g., 2-ethylhexyl), the aldol condensation, or by organoaluminum-catalyzed oligomerization of alpha olefins (especially ethylene), followed by oxidation, are also useful. These higher synthetic alcohols are discussed in detail in the hereinabove-cited "Encyclopedia of Chemical Technology", Vol. 1, pp. 560–569, which is hereby incorporated by reference for disclosures relating to higher synthetic alcohols.

Also useful as organic hydroxy compounds are the alicyclic analogs of the above-described alcohols, examples are cyclopentanol, cyclohexanol and cyclododecanol.

Polyhydroxy compounds are also useful. These include ethylene, propylene, butylene, pentylene, hexylene and heptylene glycols wherein the hydroxy groups are separated by 2 carbon atoms; tri-, tetra-, penta-, hexa- and heptamethylene glycols and hydrocarbon-substituted analogs thereof (e.g., 2-ethyl-1,3-trimethylene glycol, neopentyl glycol), as well as polyoxyalkylene compounds such as diethylene and higher polyethylene glycols, tripropylene glycol, dibutylene glycol, dipentylene glycol, dihexylene glycol and diheptylene glycol, and their monoethers.

Phenol, naphthols, substituted phenols (e.g., the cresols), and dihydroxyaromtic compounds (e.g., resorcinol, hydroquinone), as well as benzyl alcohol and similar dihydroxy compounds wherein the second hydroxy group is directly bonded to an aromatic carbon (e.g., 3-HO$\Phi$CH$_2$OH wherein $\Phi$ is a divalent benzene ring) are also useful, as are sugar alcohols of the general formula HOCH$_2$(CHOH)$_{1-5}$CH$_2$OH such as glycerol, sorbitol, mannitol, etc. (described in detail at pp. 569–588 of Vol. 2 of "Encyclopedia of Chemical Technology", referred to hereinabove) and their partially esterified derivatives, and methylol polyols such as pentaerythritol and its oligomers (di- and tripentaerythritol, etc.), trimethylolethane and trimethylolpropane.

The preferred hydroxy compounds are alcohols containing up to about 40 aliphatic carbon atoms, and especially polyhydric alcohols containing about 2–10 carbon atoms and usually about 3–6 hydroxy groups (e.g., glycerol, pentaerythritol, sorbitol, mannitol, trimethylolethane and trimethylolpropane). Pentaerythritol is especially preferred.

The esterification of the free salicylic acid is usually effected by reacting the same with the desired organic hydroxy compound at a temperature above about 50° C. and lower than the decomposition temperature of the reaction mass and the constituents thereof. The temperature is ordinarily about 50°–225° C..

The relative proportions of organic hydroxy compound to salicylic acid are not critical. Generally, the ratio of equivalents of hydroxy compound to acid will be at least about 1:1. (For the purpose of this invention, equivalent weights of the hydroxy compound and the salicylic acid are determined by dividing their molecular weights by the number of hydroxy groups and carboxy groups, respectively, per molecule.) From a stoichiometric standpoint, not more than one equivalent of hydroxy compound is required per mole of acid. However, it is frequently preferred to use a stoichiometric excess of hydroxy compound, typically up to about 10 and usually 5 or less equivalents per equivalent of acid.

The reaction is typically carried out in the presence of a substantially inert, non-polar, normally liquid organic diluent. Suitable diluents will be apparent to those skilled in the art and include, for example, hydrocarbons such as naphtha, mineral oil, benzene, toluene and xylene. Ordinarily, an acidic esterification catalyst such as sulfuric acid, p-toluenesulfonic acid or the like is present in relatively small amounts.

The esters of this invention may also be prepared by an ester interchange reaction, typically between a relatively high boiling alcohol and an ester derived from a lower boiling alcohol. The interchange reaction is ordinarily effected in the presence of an acidic catalyst such as those mentioned hereinabove, usually at temperatues somewhat higher than those required for esterification of the free acid. Temperatures of about 100°–250° C and especially about 150°–250° C. are preferred.

A preferred method for producing the esters of this invention is by the reaction of an organic hydroxy compound as described hereinabove with a vic-hydroxyalkyl ester of the salicylic acid. Such vic-hydroxyalkyl esters are conveniently prepared by the reaction of the free salicylic acid with an epoxide, usually ethylene oxide or propylene oxide.

The reaction between the hydroxy compound and the vic-hydroxyalkyl ester is usually carried out between room temperature and the decomposition temperature of the reaction mixture, most often at about 100°–200° C. The ratio of equivalents of hydroxy compound to vic-hydroxyalkyl ester is generally the same as defined above with respect to the hydroxy compound and the free acid and is usually between about 1:1 and 3:1, preferably between 1:1 and 1.5:1. It is possible, though frequently not necessary, to employ a substantially inert, normally liquid organic diluent, typically a hydrocarbon (such as those enumerated above with respect to ester preparation), an ether or a similar diluent of the type known to those skilled in the art.

Purification of the esters of this invention is usually not necessary, since they may be dissolved in a suitable diluent such as mineral oil and used directly as lubricant additives. If purification is desired, it may be accomplished by conventional methods such as distillation.

Also within the scope of this invention are chemical post-treatment products of the above-described esters. For the purpose of this invention, "post-treatment products" include those obtained by post-treating the salicylic acids and subsequently converting them to esters, and those obtained by post-treating the esters themselves. Among the post-treatment products contemplated within the scope of this invention are the following:

(1) Sulfur-containing products obtained by reaction with sulfur, sulfur halides such as sulfur monochloride and sulfur dichloride, or carbon disulfide.

(2) Alkylene-bridged compounds formed by reaction witn an aldehyde (usually formaldehyde) or a reversible polymer thereof such as paraformaldehyde.

(3) Mannich bases formed by reaction with an aldehyde (usually formaldehyde) or a reversible polymer thereof and an amine containing at least one hydrogen atom bonded directly to nitrogen.

(4) Acylated products obtained by reaction with an aliphatic carboxylic acid, especially a hydrocarbon-substituted succinic acid, or derivative thereof such as an anhydride, acyl halide, ester or the like.

(5) Sequential post-treatment products involving combinations of the foregoing. For example, a methylene-bridged composition may subsequently be sulfurized, acylated with a hydrocarbon-substituted succinic acid, converted into a Mannich base or the like.

The preparation of the esters of this invention is illustrated by the following examples. All percentages and parts are by weight. Molecular weights are number average molecular weights ($\overline{M}n$) as determined by vapor phase osmometry, acid number or hydroxyl analysis.

EXAMPLE 1

A mixture of 5720 parts (5.5 equivalents) of an alkyl-substituted phenol ($\overline{M}n$ 885) formed by alkylating phenol with tetrapropene and 399 parts (6.05 equivalents) of potassium hydroxide is heated at 250°–260° C. for 12 hours and dried under nitrogen. At 210° C. 2000 parts of mineral oil is added. Carbon dioxide blowing is started at 180° C. and the reaction mixture is allowed to cool to 145° C. Carbon dioxide blowing is continued at 145°–155° C. until the reaction is complete. The reaction mixture is cooled to 85° C. and 589 parts of concentrated hydrochloric acid is added. Then 800 parts of toluene and 500 parts of water are added and the mixture is heated under reflux for 2 hours, stripped and filtered to yield a substituted salicylic acid.

A mixture of 437 parts (0.23 equivalent) of the substituted salicylic acid prepared as described above, 10 parts of p-toluenesulfonic acid and 300 parts of xylene is heated at 140°–145° C. for 3 hours. Pentaerythritol, 17 parts, is added and the mixture is heated to 205° C. to remove volatiles and maintained at 200–205° C. for 3 hours under nitrogen. The mixture is filtered to yield the desired pentaerythritol ester (75% solution in mineral oil).

EXAMPLE 2

A mixture of 6417 parts (3.38 equivalents) of the substituted salicyclic acid of Example 1 and 15 parts of lithium carbonate is heated to 145°–155° C. Propylene oxide, 232 parts (4 equivalents), is added over 3.5 hours and the mixture is stripped at 135°–145° C. under vacuum. The desired 2-hydroxypropyl ester (76% solution in mineral oil) is obtained by filtration.

A mixture of 980 parts (0.5 equivalent) of the 2-hydroxypropyl ester and 37.5 parts (1.1 equivalents) of pentaerythritol is heated to 225°–230° C. while propylene glycol is continuously removed by nitrogen blowing. After stripping, the mixture is filtered to yield 871 parts of the desired pentaerythritol ester (76% solution in mineral oil).

EXAMPLE 3

Following substantially the procedure of Example 2, the 2-hydroxyethyl ester of the same acid is prepared and 1.0 mole thereof is reacted with 2.2 moles of 1-decanol to yield an oil solution of the desired 1-decyl ester.

EXAMPLE 4

Following substantially the procedure of Example 2, the 2-hydroxyethyl ester of the same acid is prepared and 1.0 mole thereof is reacted with 2.2 moles of 1-dodecanol to yield an oil solution of the desired 1-dodecyl ester.

EXAMPLE 5

A mixture of 744 parts of an ester prepared as described in Example 2, 20 parts of a commercial ethylene polyamine mixture containing about 3–7 amino groups per molecule, 11 parts of paraformaldehyde and 200 parts of toluene is heated at 130°–134° C. as water is removed by azeotropic distillation. The mixture is cooled to room temperature and 145 parts of mineral oil is added. The mixture is then stripped to 151°C. under vacuum and filtered at 140° C. to yield an oil solution of the desired Mannich base.

EXAMPLE 6

A mixture of 572 parts of the ester of Example 2 and 71 parts of tetrapropenyl-substituted succinic anhydride is heated at 120° C. for 2.5 hours, 130° C. for 2.5 hours and then filtered to yield an oil solution of the desired product.

EXAMPLE 7

A mixture of 1615 parts of the ester of Example 2 and 32 parts of sulfur is heated at 155°–160° C. for 8.5 hours under nitrogen. At 93° C., 48 parts of carbon disulfide is added slowly under the surface over 1.5 hours with nirogen blowing. The mixture is heated at 142°–166° C. for 10 hours and stripped to 176° C. under vacuum. At 120° C. 30 parts of mineral oil is added and the mixture is filtered to yield an oil solution of the desired product.

As previously indicated, the esters of this invention are useful as additives for lubricants and normally liquid fuels, where they function primarily as dispersants; that is, they maintain accumulated sludge, dirt and other insolubles in suspension. The lubricants in which these compositions can be employed include diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, jet aircraft turbines, stationary power engines and turbines and the like. Automatic transmission fluids, transaxle lubricants, gear lubricants, metal-working lubricants, hydraulic fluids and other lubricating oil and grease compositions can also benefit from the incorporation therein of the esters of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins [e.g., polybutylenes, polypropylenes, propyleneisobutylene copolymers, chlorinated polybutylenes, poly(1-hexenes), poly(1-octenes), poly(1-decenes), etc. and mixtures thereof]; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester or tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants [e.g., tetraethyl silicate, tetraisopropyl silicate, tetra(2-ethylhexyl) silicate, tetra-(4methyl-2-ethylhexyl) silicate, tetra-(p-tert-butylphenyl) silicate, hexyl-(4-methyl-2-pentoxy) disiloxane, poly(methyl) siloxanes, poly(methylphenyl) siloxanes, etc.]. Other synthetic lubricating oils include liquid esters of phosphorus-containing acids (e.g., tricresyl phosphate, trioctyl phosphate, diethyl ester of decylphosphonic acid, etc.), polymeric tetrahydrofurans and the like.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by process similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricants of the present invention contain a minor amount of the ester of this invention sufficient to disperse sludge and other insolubles therein. Normally this amount will be about 0.05–20.0%, preferably about 0.5–10.0%, of the total weight of the lubricant. In lubricating oils operated under extremely adverse conditions, such as lubricating oils for marine diesel engines, the esters of this invention may be present in amounts of up to about 30%.

This invention also contemplates the use of other additives in combination with the esters of this invention. Such additives include, for example, auxiliary detergents and dispersants of the ash-producing or ashless type, corrosion- and oxidation-inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radial. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Auxiliary ashless detergents and dispersants are so called despite the fact that, depending on its constitution, the dispersant may upon combustion yield a nonvolatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative.

| | |
|---|---|
| 3,413,347 | 3,725,480 |
| 3,697,574 | 3,726,882 |
| 3,725,277 | |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phorphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein, for their disclosures of ashless dispersants.

Extreme pressure agents and corrosion- an oxidation-inhibiting agents are exemplified by chlorinated aliphatic hydrocarbons such as chlorinated wax; organic sulfides and polysulfides such as benzyl disulfide, bis(-chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The fuel compositions containing the esters of this invention contain a major proportion of a normally liquid fuel, usually a hydrocarbonaceous petroleum distillate fuel such as motor gasoline as defined by ASTM Specification D-439-73 and diesel fuel or fuel oil as defined by ASTM Specification D-396. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials also contemplated. Examples of such mixtures are gasoline-ethanol and diesel fuel-ether combinations. Particularly preferred is gasoline, that is, a mixture of hydrocarbons having an ASTM boiling point of about 60° C. at the 10% distillation point to about 205° C. at the 90% distillation point.

Generally, these fuel compositions contain an amount of the ester of this invention sufficient to disperse sludge and other insolubles therein and/or to clean fuel system components such as fuel lines and carburetors; usually this amount is about 1–50,000, preferably 4–5000, parts by weight per million parts of fuel.

The fuel compositions can contain, in addition to the ester of this invention, other additives which are well known to those of skill in the art. These can include antiknock agents such as tetra-alkyl lead compounds, lead scavengers such as halo-alkanes (e.g., ethylene dichloride and ethylene dibromide), deposit preventers or modifiers such as triaryl phosphates, dyes, cetane inprovers, antioxidants such as 2,6-di-tertiary-butyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like.

The esters of this invention can be added directly to the lubricant or fuel. Preferably, however, they are diluted with a substantially inert organic liquid diluent such as mineral oil, naphtha, benzene, toluene, xylene or gasoline to form an additive concentrate. These concentrates generally contain about 20-90% of the ester of this invention and may contain, in addition, one or more of the other additives described hereinabove.

The following is typical of the lubricating compositions of this invention. All numerical values represent parts by weight. Except for the values for mineral oil and for the product of Example 2, all amounts are exclusive of mineral oil used as diluent.

| Ingredient | | |
|---|---|---|
| Mineral oil | 89.39 | parts |
| Product of Example 2 | 4.30 | parts |
| Basic calcium petroleum sulfonate | 2.57 | parts |
| Basic calcium salt of sulfurized alkylphenol | 1.69 | parts |
| Zinc tetrapropenylphenyl-phosphorodithioate | 2.05 | parts |
| Silicone anti-foam agent | 0.01 | |

A typical fuel composition containing an ester of this invention consists of gasoline containing the product of Example 2 in the amount of 83.2 parts per million parts of gasoline.

What is claimed is:

1. A composition comprising esters of substituted hydroxyaromatic carboxylic acids in which at least one substituent is a hydrocarbon-based radical containing at least about 10 carbon atoms.

2. A composition according to claim 1 wherein the hydrocarbon-based radical is a substantially saturated aliphatic hydrocarbon radical containing about 10-225 carbon atoms.

3. A composition according to claim 2 comprising an ester of a substituted salicylic acid.

4. A composition according to claim 3 wherein the aliphatic hydrocarbon radical is derived from propylene, 1-butene or isobutene and has a molecular weight of about 150-1750.

5. A composition according to claim 4 wherein the ester is derived from an alcohol containing up to about 40 aliphatic carbon atoms.

6. A composition according to claim 5 wherein the alcohol is a polyhydric alcohol containing about 2-10 carbon atoms.

7. A composition according to claim 6 wherein the alcohol is pentaerythritol.

8. A product comprising an ester according to claim 1 post-treated with an aldehyde and an amine containing at least one hydrogen atom bonded directly to nitrogen.

9. A composition according to claim 8 wherein the aldehyde is formaldehyde and the amine is an alkylene polyamine.

10. A composition according to claim 9 wherein the alkylene polyamine is an ethylene polyamine.

11. An additive concentrate comprising a substantially inert organic liquid diluent and about 20-90% by weight of a composition according to claim 1.

12. An additive concentrate comprising a substantially inert organic liquid diluent and about 20-90% by weight of a composition according to claim 2.

13. An additive concentrate comprising a substantially inert organic liquid diluent and about 20-90% by weight of a composition according to claim 3.

14. An additive concentrate comprising a substantially inert organic liquid diluent and about 20-90% by weight of a composition according to claim 7.

15. An additive concentrate comprising a substantially inert organic liquid diluent and about 20-90% by weight of a composition according to claim 8.

16. A lubricant composition comprising a lubricating oil and about 0.05%-30.0% by weight of the lubricant composition of a composition according to claim 1.

17. A lubricant composition comprising a lubricating oil and about 0.05%-30.0% by weight of the lubricant composition of a composition according to claim 2.

18. A lubricant composition comprising a lubricating oil and about 0.05%-30.0% by weight of the lubricant composition of a composition according to claim 3.

19. A lubricant composition comprising a lubricating oil and about 0.05-20% by weight of the lubricant composition of a composition according to claim 4.

20. A lubricant composition comprising a lubricating oil and about 0.05-20% by weight of the lubricant composition of a composition according to claim 5.

21. A lubricant composition comprising a lubricating oil and about 0.05-10% by weight of the lubricant composition of a composition according to claim 6.

22. A lubricant composition comprising a lubricating oil and about 0.5-10% by weight of the lubricant composition of a composition according to claim 7.

23. A lubricant composition comprising a lubricating oil and about 0.05-30.0% by weight of the lubricant composition of a composition according to claim 8.